(12) United States Patent
Slavik

(10) Patent No.: US 10,829,261 B2
(45) Date of Patent: Nov. 10, 2020

(54) BIODEGRADABLE PARTITIONED TRAY FOR STORING AND TRANSPORT OF PACKAGED FOOD PRODUCTS

(71) Applicant: Zoltan Slavik, Novi Sad (RS)

(72) Inventor: Zoltan Slavik, Novi Sad (RS)

(*) Notice: Subject to any disclaimer, the term of this patent is extended or adjusted under 35 U.S.C. 154(b) by 95 days.

(21) Appl. No.: 16/336,901

(22) PCT Filed: Jul. 18, 2017

(86) PCT No.: PCT/RS2017/000008
§ 371 (c)(1),
(2) Date: Mar. 26, 2019

(87) PCT Pub. No.: WO2018/030904
PCT Pub. Date: Feb. 15, 2018

(65) Prior Publication Data
US 2019/0300227 A1 Oct. 3, 2019

(30) Foreign Application Priority Data

Aug. 12, 2016 (RS) .............................. MP-2016/0032

(51) Int. Cl.
| B65B 1/34 | (2006.01) |
| B65D 1/36 | (2006.01) |
| B65D 21/02 | (2006.01) |
| B65D 65/46 | (2006.01) |
| B65D 71/70 | (2006.01) |
| B65D 85/34 | (2006.01) |

(52) U.S. Cl.
CPC ........... *B65D 1/36* (2013.01); *B65D 21/0233* (2013.01); *B65D 65/466* (2013.01); *B65D 71/70* (2013.01); *B65D 85/34* (2013.01); *Y02A 40/961* (2018.01); *Y02W 90/13* (2015.05)

(58) Field of Classification Search
CPC .... B65D 1/36; B65D 21/0233; B65D 65/466; B65D 71/70; B65D 85/34; Y02W 90/13; Y02A 40/961
USPC ......... 206/557, 561, 562, 564; 229/407, 904
See application file for complete search history.

(56) References Cited

U.S. PATENT DOCUMENTS

| 4,722,440 | A | * | 2/1988 | Johnston | ................. | B65D 71/70 206/319 |
| 4,928,841 | A | * | 5/1990 | Arthurs | ................... | B65D 71/70 206/203 |
| 6,276,531 | B1 | * | 8/2001 | Andrews | ................ | B65D 85/32 206/511 |

(Continued)

*Primary Examiner* — Luan K Bui
(74) *Attorney, Agent, or Firm* — Michael D. Eisenberg

(57) ABSTRACT

A biodegradable crate for storing and transport of food products has a crate body (1), in the form of a hollow quadrilateral prism framed by a rectangular perimeter (2) with rounded corners, and with an end (18) folded downwards. Twenty identical cup beds (3) are distributed evenly and separated from one another by twelve integrally made prismatic divider elements (4), in the shape of hollow quadrilateral prisms with rounded vertices (5) and connections (10) in the shape of hollow cuboids with shorter flat sides (12) and longer concave sides (13), and with ratio of connection (10) and divider element (4) heights preferably made in a scale of 2:3. The cup beds (3) have the shape of truncated cones oriented so that their narrow sides form the bottom of the crate body (1), and the dimensions that are analogue to bottom parts of plastic cups (7).

1 Claim, 3 Drawing Sheets

(56) References Cited

U.S. PATENT DOCUMENTS

| | | | |
|---|---|---|---|
| 8,333,275 B2 * | 12/2012 | McFarlane | B65D 21/0234 206/144 |
| 2010/0258467 A1 * | 10/2010 | Apps | B65D 1/243 206/427 |
| 2011/0226663 A1 * | 9/2011 | Bushell | B65D 85/36 206/564 |
| 2014/0166517 A1 * | 6/2014 | Chapel | A01G 9/045 206/423 |
| 2014/0197064 A1 * | 7/2014 | Prince | B65D 71/70 206/501 |

* cited by examiner

BIODEGRADABLE PARTITIONED TRAY FOR STORING AND TRANSPORT OF PACKAGED FOOD PRODUCTS

TECHNICAL FIELD TO WHICH THE INVENTION RELATES

Generally speaking, the subject invention refers to the field of packaging intended for keeping and transport of goods from producers to users or consumers, whereas, in more specific terms, it refers to the field of single-use ecological packaging meant for storing and transport of consumer goods already inside their own primary production packaging such as mainly yogurt, curdled milk, processed cheese, pudding and other dairy products.

According to the International Patent Classification (MKP, Intcl[8]), the subject of invention is diverse and marked with basic classification symbol B65D 71/70 referring to trays carrying containers that are partially connected by stacking elements made by bending plates i.e. creases or indents marked by secondary classification symbol B65D 21/04 referring to packaging which may be inserted into one another when emptied, i.e. stacked into another or connected with one another when full.

As it is the type of packaging which brings certain technological improvement, in terms of saving of time necessary for packing, consumption of processed material and reduction of certain ecological problems the subject invention may be marked also with additional secondary symbol B65D 81/00 used for marking the packaging which could be used after emptied for purposes other than packaging.

Technical Problem

The technical problem solved by subject invention refers to the following issue: how to design the secondary biodegradable packaging for storing and transport of primary packaging of food products, primarily of dairy but also other products packed in plastic cups, classified as so called single-use, non-returnable packaging, with enough mechanical stability which prevents mechanical damage during transport and provides more reliable fitting of cups to the walls of cup beds, eliminating thus the possibility of overturning and falling out of primary packaging with improved protection of content against variations of microclimate factors and micro-organisms.

BACKGROUND OF THE INVENTION

The accelerated development of society and all branches of industry, especially the food industry, dictates the necessary development of all products referring to adequate storing and transport of food products. In reference to intended use of the invention, the author focused on inventions in the field of storing and transport of secondary packaging specifically on inadequate adherence and fitting of primary packaging such as cups for dairy products into secondary containers of transport packaging often leading to their overturning and even dropping out during storing and transport by supplier. A large number of authors has been specially engaged in trying to invent the packaging which is safer, more efficient, more economical for manufacturing, and at the same time made in compliance with ever more strict ecological requirements. Special attention has been paid to inventions referring to biodegradable packaging the use of which successfully solves the problem of substituting plastic containers related to several issues: aesthetic, ecological and particularly spatial, since they require special places for storing and stacking.

By way of searching the state-of-the-art the following somewhat similar inventions have been found:

The U.S. Pat. No. 5,975,300 A "Transport cardboard boxes for glass bottles with paper pulp insert to be used inside them and their combinations", published on Nov. 2, 1999, although referring to the subject state-of-the-art and cardboard packaging, differs from the subject invention by structure since it has been intended for inserting glass bottles in reference to which it was designed with bottle beds with arch divider elements which surely do not provide quality transport of plastic cups for dairy products. It is easily noticeable that such packaging is used exclusively as a spacer inserted in appropriate cardboard boxes.

In the American U.S. Pat. No. 3,791,549 A published on Feb. 12, 1974, and named "Transport crates for plastic cups and other containers", there is a plastic crate for packing plastic cups which enables their safe transport but which differs significantly from the subject invention in terms of design, primarily because the bottom of the cup holder is designed as a star-form grid with addition of the height of cup bed being equal to the height of cup since it is a requirement for preventing overturning of cups when inserting or transporting them. However, this caused another problem, since such crates are of larger sizes and require more space for their storing.

In the patent application GB2032886 A published on May 14, 1980, there is the invention named "Packing trays", which differs from the subject invention in design of beds and partitions which connect divider elements so that the presented solution is in terms of structure less stable due to the lack of reinforcements resulting in less protection of cups against dropping out and their proneness to deformation.

In the patent application DE102005002374 A1 published on Jul. 27, 2006, there is an invention named "Universal packaging i.e. packaging for single use", filed by Scholler Wavin System Services, which differs from the subject application in design of beds, divider elements as well as in the lack of partitions which significantly undermines the stability of cups with note that the solid outer frame is less convenient for storing due to the fact that it requires large space for stacking.

In the American U.S. Pat. No. 4,928,841 A published in May 29, 1990, filed under the name of "Packaging for bottles", there is a plastic crate described for PET bottles used for carbonized drinks with beds whose bottoms are such that they fit the bottom of bottles inserted in them, in addition to which it is easily noticeable that side wall of beds are vertical due to which reason this solution is not convenient for inserting standard plastic cups for dairy products which are prism-shaped, with round section and tilted sides.

In the American U.S. Pat. No. 3,203,583, published on Aug. 31, 1965 and titled "Packaging for containers", there is a plastic crate described for packaging cups for food products for which the beds are made with large space between beds and with a shape of modified hollow prisms of square section so that the packaging space is not used adequately. Also, it is observed that the rims of crates are designed in such a way that when stacking empty crates they rest onto one another due to which they require more space in which to be stored.

During the search, there has also been found the solution of the registered small patent RS1373U of author Kiril Žmura titled "Recycled cardboard crates for plastic cups", which describes the cardboard packaging in which the design of cup beds, divider elements and partitions connecting the divider elements is such that it solves the problem of better fitting of cup primary packaging to the cup bed walls. By careful analysis of this invention, the constructive errors were found which lead to instability of embedded cups and their difficult inserting into the crate beds.

The same author presented the improved crate made of recycled paper named "Cardboard crate for plastic cups", published on Mar. 28, 2013 under number WO2013043073 A1. It presents the solution from which it is visible that the construction of beds and divider elements does not provide stable transport and easy inserting of cups inside the crates.

On grounds of faults noticed in the above mentioned inventions, the author decided to present the new design of crates made of biodegradable ecological materials which fully solves the aforementioned technical problem.

SUMMARY OF THE INVENTION

The essence of the invention lies in constructive solution of secondary biodegradable packaging consisting of the body of hollow prismatic form with symmetrically positioned beds formed by lateral sides of divider elements and connections which make together with lateral sides and bottom of the crate body a light structure which is consistent enough to provide safe keeping, storing and transport of dairy products packed up in plastic cups of primary packaging.

The novelty of the invention is reflected in the fact that the divider elements are designed in the form of hollow quadrilateral prisms with rounded vertices whereas connections are made as hollow cuboids with shorter flat sides and longer concave sides so as to form compact beds in the form of truncated cones which correspond in shape and size to dimensions of plastic cups of primary packaging, providing thus easy insertion and better fitting of packaging itself upon cup bed walls which ensures stable position during transportation.

The core of the invention is also in the fact that the lateral sides of the cup beds are designed in such a way so as to fully eliminate the possibility of turning over the plastic cups when inserted into the crate body.

The novelty of this invention is also in the positioning of divider elements and connections made so that the construction of the body of packaging is of a small overall size and light but consistent enough to provide adequate resistance to mechanical impact, various pressure occurring in transport with sufficient flexibility enabling easy handling when placing on shelves or other places for sale.

The constructive novelty is in the distance among cup beds designed so that the lids of plastic cups of primary packaging are positioned slightly away from one another making in that way a compact surface on which one or more crates could be placed without any problem when storing or transporting them.

The main point of this invention is in the fact that the subject packaging fully accomplishes the important goal of getting a cheap product with important ecological characteristics, providing the more favorable price and at the same time keeping all the features of the plastic packaging it substitutes (resistance to various mechanical impacts, certain hardness, flexibility, resistance to temperatures, pressure etc.).

Besides the above mentioned, the subject invention has also the following advantages over already known technical solutions, among which the most important are:

significantly reduced production time;
significantly less space for stacking before recycling;
easier manipulation with full crates;
significantly less quantities of scrap in production;
reduced loss caused by interruptions in production, which usually occur in production of cardboard boxes due to various inaccuracies in manufacturing.

BRIEF DESCRIPTION OF THE FIGURES AND THE DRAWINGS

In order to make a better understanding of the invention as well as to show how it can be realized in practice, the author, only by way of example, points to the accompanying drawings that relate to the subject application and where:

DETAILED DESCRIPTION OF THE INVENTION

Observing the figures of annexed drawing it is easily detected that the subject invention is a biodegradable secondary packaging intended for stacking, storing and transport of food products previously packed in primary packaging i.e. in cups made of plastic which are mostly in the shape of truncated cones with round section used widely for packaging primarily dairy products. According to the concept of this invention based upon substitution of existing plastic crates that are harder to maintain, demand large space for storing and are complicated to keep and return to producers, the subject crates are made of biodegradable material i.e. paper pulp which are easily degradable in nature so that the subject invention is an environment-friendly product fully in compliance with the most strict regulations applicable to this field.

Figure 1:
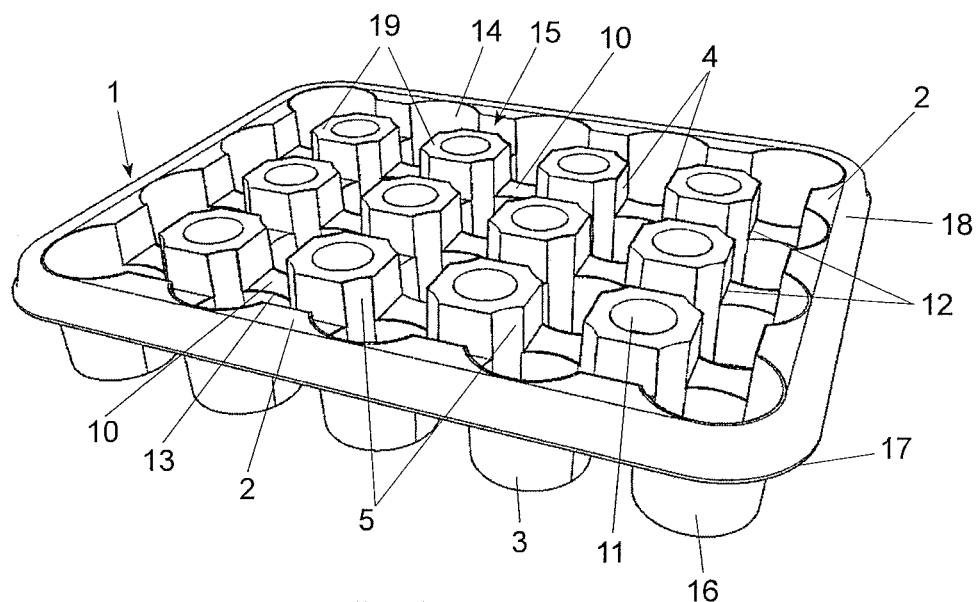
FIG. 1 is a side view of an axonometric appearance of the subject crate.
Figure 2:
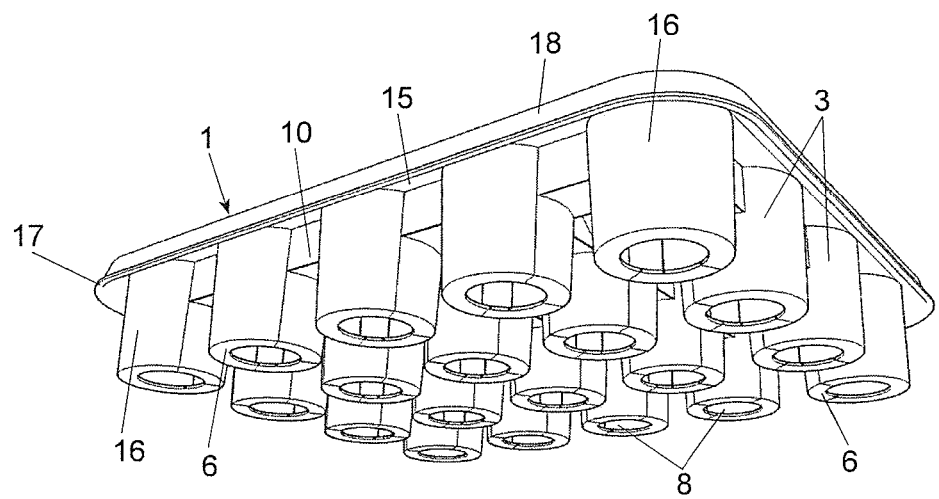
FIG. 2 is a bottom view of an axonometric appearance of the subject crate.
Figure 3:
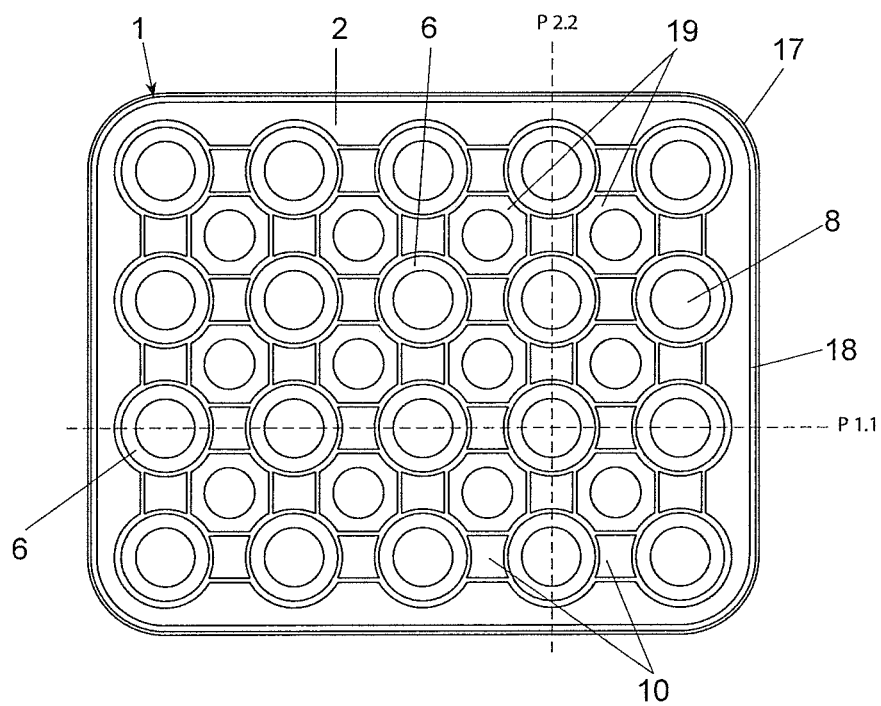
FIG. 3 is a top view of the subject crate appearance.
Figure 4:
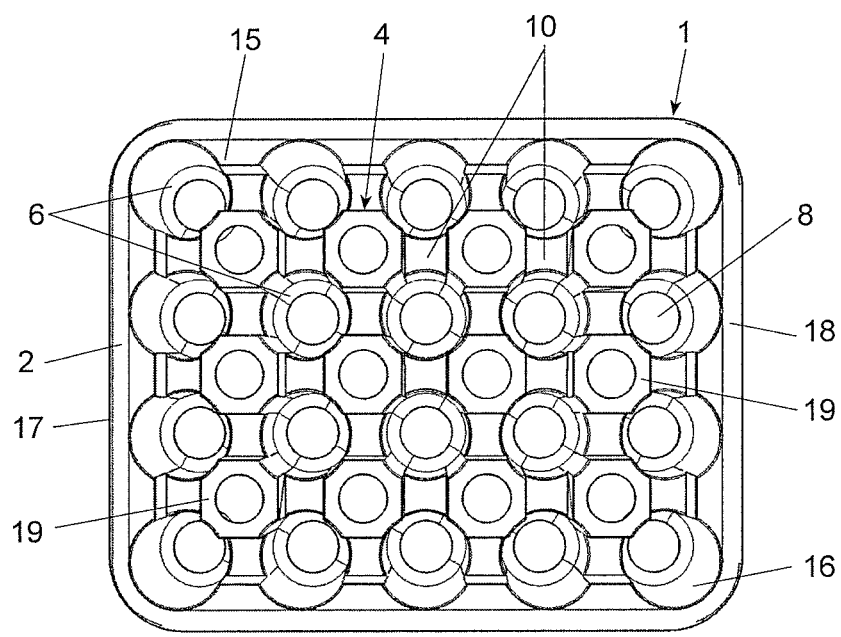
FIG. 4 is a top view of an axonometric appearance of the subject crate.
Figure 5:
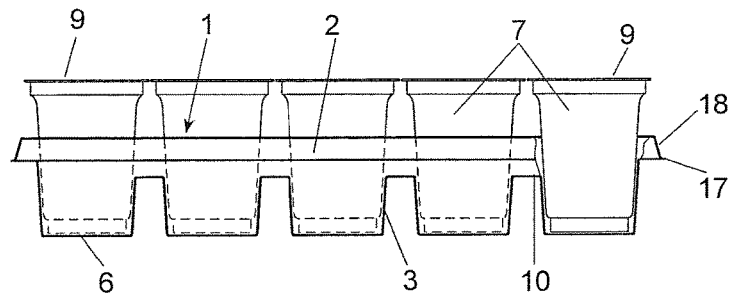
FIG. 5 is a schematic view of the subject crate with inserted cups from the shorter lateral side.
Figure 6:
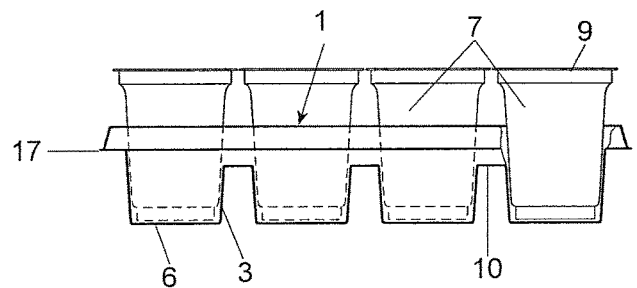
FIG. 6 is a schematic view of the subject crate with inserted cups from the longer lateral side.
Figure 7:
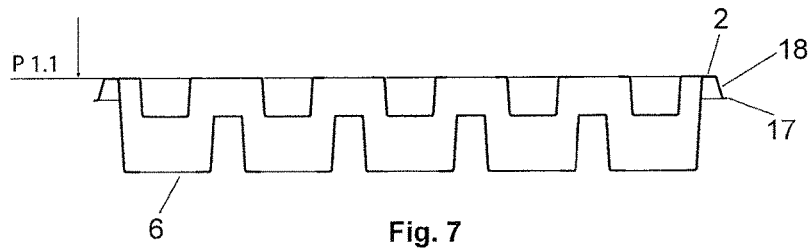
FIG. 7 is a view of the subject crate in vertical section 1-1 along the longer side.
Figure 8:
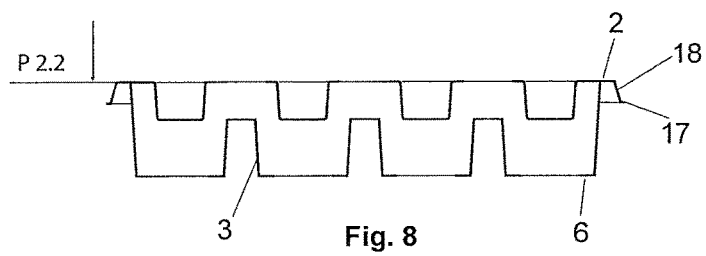
FIG. 8 is a view of the subject crate in vertical section 2-2 along the shorter side.

The crate body 1 has the shape of a hollow quadrilateral prism rimmed with rounded rectangular perimeter 2 with end 18 bent downwards in which there are twenty evenly distributed identical cup beds 3, five along the longer side, and four cup beds 3 along the shorter side. It may be observed in FIGS. 1, 2 and 3, that the crate body 1 consists of fourteen outer and four inner cup beds 3 which are divided from one another by sixteen integrally made, also prismatic, divider elements 4, in the shape of hollow quadrilateral prisms with rounded vertices 5 and connections 10 in the shape of hollow cuboids made so that their shorter sides 12 are flat, and longer sides 13 concave where the proportion of heights of connection 10 and divider elements 4 is best made in the scale 2:3. In the centers of the upper horizontal surfaces of divider elements 4 there are annular openings 11 positioned so as to form the ring-shape surfaces 19 with outer rims in the shape of modified squares with concave vertices, whereas their inner rims are of the round shape. End 18 of perimeter 2 of subject crate body 1 is folded downwards so as to form an angle of 120° with its upper rim and in its end there is along entire perimeter a shorter creasing 17 made. When observed from the top and the bottom, in FIGS. 1, 2 and 4, it may be seen that the cup beds 3 have the shape of truncated cones oriented so as to have their narrow sides forming the bottom of the crate body 1 due to which when viewed from the bottom it has an appearance of symmetrically divided ring-like surfaces 6 with annular openings 8 positioned in the centers. It is necessary to highlight that cup beds 3 are slightly larger in terms of dimensions than bottom parts of plastic cups 7 which are after filling, when prepared for transport or storing, inserted in the crate body 1, falling down to ring-shaped surfaces 6 and in doing so fitting in optimum way the lateral sides of cup beds 3 preventing unwanted movements, i.e. turning over when stored or transported. It is underlined that upper rims 9 of cups 7, after being inserted in cup beds 3 are slightly divided, so as to form a flat, compact surface, on which the next crate may easily be placed, while such a position of upper rims 9 of cups 7 also contributes to stability during transport.

By observing the annexed drawing it may be noticed that the cup beds 3 in the inner part of the crate body 1 are formed by four rounded vertices 5 of divider elements 4 and four opposite concave longer sides 13 of connections 10, while the cup beds 3 positioned along the rim of the crate body 1 are framed by three concave longer sides 13 of connections 10 and two rounded vertices 5 of divider elements 4 and an arch segment 14 of lateral side 15 of the crate body 1. The cup beds 3 located along the rim of the crate body 1, positioned at its vertices, are formed by two concave longer sides 13 of connections 10, rounded vertex 5 of divider element 4 and a concave edge 16 which is, at the same time, also the vertices edge of lateral side 15 of the body crate 1.

Figure 9:
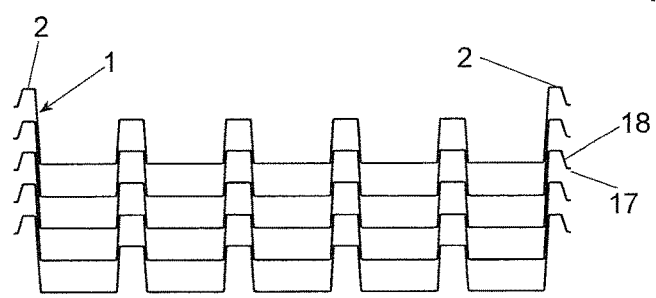
FIG. 9 is a view of stacked empty crates.

Such a design of the crate body 1 formed by integrally made, mutually symmetrical divider elements 4 and connections 10, framed by perimeter 2, is simple for manufacturing and handling, secures the content of food products packed in the primary plastic packaging against mechanical damages providing at the same time the relevant flexibility, resistance to temperature, pressure and improved features protection against variation of microclimate factors and micro-organisms. FIG. 9 indicates that empty subject crates stacked one on another take a very small amount of space for storing prior to recycling.

INDUSTRIAL AND OTHER APPLICATIONS OF THE INVENTION

Industrial manufacturing of the subject invention is absolutely possible in factories for production of cardboard packaging and even in well equipped stores for manufacturing of packaging made of recycled paper, on grounds of technical documentation that experts from the subject field may easily prepare using the description and drawings from this patent application.

The subject invention is convenient for serial production and it is easily applicable in stacking primary packagings, especially plastic cups intended for packing various kinds of dairy products such as yogurt, curdled milk, pudding, kefir and other.

The application of this invention is especially recommended in cases when due to small space it is difficult to store packaging materials or when it is forbidded out of environmental and aesthetic reasons.

The invention claimed is:

1. A biodegradable packaging for storing and transport of food products, characterized by that, a crate body (1), is of the hollow quadrilateral prismatic shape framed by rounded rectangular perimeter (2) with end (18) folded downwards which contains twenty identical evenly distributed cup beds (3), five positioned along the longer side and four cup beds (3) along the shorter side, mutually divided by sixteen integrally made and also prismatic divider elements (4), in the shape of hollow quadrilateral prisms with rounded vertices (5) and connections (10) in the shape of hollow cuboids made so that their shorter sides (12) are flat and their longer sides (13) concave, while the ratio of heights between the connections (10) and the divider elements (4) is best made in scale 2:3; and that in the centers of upper horizontal surfaces of the divider elements (4) there are annular openings (11) positioned so as to form ring-shaped surfaces (19) with outer edges in the form of modified squares with concave vertices, while their inner edges are of the circular form, and with the end (18) of the perimeter (2) of the body crate (1) folded downwards, so as to form an angle of 120° with its upper edge while there is in its end along its entire perimeter a short creasing (17) made, and the cup beds (3) in the shape of truncated cones oriented so that their narrow sides form the bottom of the crate body (1) of ring-shaped surfaces (6) with annular openings (8) centrally positioned, while the cup beds (3) located in the inner part of the crate body (1) are formed by four rounded vertices (5) of the divider elements (4) and four opposite concave longer sides (13) of the connections (10), while the cup beds (3) located along the perimeter of the crate body (1) are framed by three concave longer sides (13) of the connections (10) and two rounded vertices (5) of the divider elements (4) and an arch segment (14) of lateral side (15) of the crate body (1), whereas the cup beds (3) located along the crate body (1), positioned at its vertices, are formed by two concave longer sides (13) of the connections (10), rounded vertex (5) of the divider element (4) and a concave edge (16).

* * * * *